United States Patent [19]

Hanton

[11] 3,915,905

[45] Oct. 28, 1975

[54] SELF-EXTINGUISHING PHENOLIC FOAMS

[75] Inventor: Daniel Hanton, La Neuville-Roy, France

[73] Assignee: Certain-teed Products Corporation, Valley Forge, Pa.

[22] Filed: May 24, 1968

[21] Appl. No.: 731,747

[52] U.S. Cl. ............ 260/2.5 F; 260/2.5 FP; 260/38; 260/39 R; 260/39 SB; 260/839; 260/840; 260/DIG. 24
[51] Int. Cl.$^2$....... C08J 9/02; C08J 9/08; C08J 9/10
[58] Field of Search ..... 260/839, 840, 2.5 FP, 2.5 F

[56] References Cited
UNITED STATES PATENTS

| | | | |
|---|---|---|---|
| 2,019,591 | 11/1935 | Wollaston | 260/840 |
| 2,452,054 | 10/1948 | Jones et al. | 260/2.5 F |
| 3,004,941 | 10/1961 | Mestdagh et al. | 260/840 |
| 3,072,595 | 1/1963 | Barth et al. | 260/840 |
| 3,077,458 | 2/1963 | Quelle et al. | 260/2.5 F |
| 3,223,668 | 12/1965 | Stalego | 260/840 |
| 3,369,056 | 2/1968 | Schwarzer | 260/840 |
| 3,404,198 | 10/1968 | Guyer | 260/840 |
| 3,434,992 | 3/1969 | Holtschmidt et al. | 260/840 |

*Primary Examiner*—Morton Foelak
*Attorney, Agent, or Firm*—Synnestvedt & Lechner

[57] ABSTRACT

Phenol formaldehyde resin foams which do not burn or smoulder and which are self-extinguishing are manufactured by a process in which the phenol formaldehyde condensate is blown in the presence of a nitrogenous additive which is the condensate of formaldehyde with an amine or may be the amine salt of a mild inorganic acid. The smouldering characteristics of prior phenol formaldehyde are overcome.

10 Claims, No Drawings

SELF-EXTINGUISHING PHENOLIC FOAMS

This invention relates to the manufacture of cellular phenol formaldehyde resins, commonly called foams. There is novelty in the foams and in the processes of making them.

Phenol formaldehyde resin foams have been made by condensing phenol with one of the forms of formaldehyde customarily used in such reactions, in the presence of a basic catalyst (for instance NaOH), the resin being hardened in a second stage by the addition of an acid catalyst (for instance HCl). The reaction is generally carried out in aqueous medium with or without other adjuvants. It is known that such resins have high insulating properties after they have been freed of water and acid catalyst by drying in an oven. Those phenolic resins are combustible and when they have been sufficiently exposed to flame, and when the flame has been removed, they smoulder away without flaming until the cellular structure has been completely carbonized.

It is equally known that, in order to make foams of high density, nitrogenous compositions should be added, for instance urea or ammonium salts. During such manufacture, two phases occur, the release of heat from the phenol formaldehyde condensation, and that, above a certain temperature, the nitrogenous compound reacts violently with the excess of formaldehyde which has been combined with phenol, in the presence of acid catalyst, initiating the very rapid hardening of the complex mass. It is impossible to control that reaction, so that the products obtained are of heterogeneous cellular structure possessing outside cells and frequently exhibiting caverns. Furthermore, the distribution of solid material is irregular in the foam. The apparent density undergoes sharp changes within the mass, and these things impart very bad insulating properties, poor and irregular mechanical properties and poor fire resistance.

It is an object of the invention to make phenol formaldehyde foams which are of uniform density, free of caverns, of uniform cell structure, of uniform mechanical properties, and which are fire-resistant. It is also an object of the invention to make phenol formaldehyde foams which are self-extinguishing by the standards established by ASTM D 1692-T. The objects of the invention are accomplished, generally speaking, by the method of making incombustible, non-smouldering phenol formaldehyde resin foams which comprises incorporating in the components of the foam, before foaming, a hardener, a foaming agent, and a nitrogenous compound which has little or no reaction with free formaldehyde, which is stable at incorporating temperature, and which at a temperature thereabove, decomposes with the liberation of a combustion repressant, and heating the resin into foam at a temperature at which the blowing agent releases gases and forms cells within the resin. The novel products made by this novel process are self-extinguishing phenol formaldehyde foams of homogeneous structure, good mechanical properties and cells of approximately uniform size.

The process of the invention introduces into the phenol resin, before blowing, a nitrogenous compound, either organic or mineral, which reacts little or not at all with the free formaldehyde of the resin, which is stable at the temperature of manufacture of the resin, as to the components used for producing the foam, but which when heated to higher temperatures such as exist at temperatures of flaming or smouldering composition, decompose with the liberation of gases which do not sustain combustion. These nitrogenous compounds contribute to the formation of a complex polymer.

In the preferred form of the invention the nitrogenous compound which is added to the phenol formaldehyde resin is very similar in constitution but contains an amino group. For instance, one may proceed in the usual way to make a phenol formaldehyde resin but, stopping the condensation at an intermediate stage, for instance between 40 and 70%, for the addition of the nitrogenous component, which may be the reaction product of phenol and formaldehyde with dicyandiamide. This ingredient will have been separately made and will be added to the phenol formaldehyde resin at the intermediate stage. The condensation will then be permitted to continue to completion. Methods of arresting the condensation are known in the art and do not need description. In this particular form of the invention the term aminoplast is useful, being defined herein, as the condensation product of an aminated substance with formaldehyde, or with formaldehyde and a substance which condenses with formaldehyde. Within the term aminoplast, we distinguish between the term condensate which includes all products of condensation of amines with formaldehyde, and cocondensates, which includes the condensates of two or more different amines reacting simultaneously or consecutively with formaldehyde. Condensates and co-condensates may also include phenol. An example of a condensate is a urea formaldehyde resin. An example of a co-condensate is a urea dicyandiamide formaldehyde resin. The condensation reactions are generally carried out in aqueous medium at room temperature and pressure.

The nitrogenous compounds may themselves be partially condensed aminoplasts, for instance the partial condensates of the reaction of formaldehyde with urea, or with melamine, or with dicyandiamide. In general, all amines are available to the reaction but dicyandiamide, urea and melamine represent a preferred class. Among the classes of amino compounds which can be used are: (1) the condensates of phenol formaldehyde and an organic amine such as urea, melamine or dicyandiamide; (2) the condensates of formaldehyde and organic amines such as urea, melamine and dicyandiamide; (3) co-condensates of formaldehyde with a plurality of organic amines, for instance any two of the three above named; and (4) nitrogenous mineral compounds, particularly the ammonium salts of mild inorganic acids, for instance ammonium sulfite and ammonium sulfamate.

The following general examples contain several specific examples which are recited by number:

The following four resins illustrate four standard types of phenol formaldehyde resins which can be produced in the ordinary way, in aqueous medium using a basic catalyst or they can be taken from stock and dispersed in aqueous medium.

Resin 1

| | | |
|---|---|---|
| phenol | 1 | mole |
| formaldehyde | 2.3 | moles |
| soda (NaOH) | 3.6% | of the weight of the phenol |

-Continued

| Resin 2 | | | |
|---|---|---|---|
| | phenol | 1 | mole |
| | formaldehyde | 2.5 | moles |
| | baryte | 8.3% | of the weight of the phenol |
| | (Ba(OH)$_2$ 8H$_2$O) | | |
| Resin 3 | | | |
| | phenol | 1 | mole |
| | formaldehyde | 2.3 | moles |
| | polyvinyl alcohol | 8.75% | of the weight of the phenol |
| | soda (NaOH) | 3.6% | of the weight of the phenol |
| Resin 4 | | | |
| | phenol | 1 | mole |
| | trioxymethylene | 2.3 | moles |
| | soda (NaOH) | 3.6% | of the weight of the phenol |

In carrying out the invention a phenolic resin, such as any one of the foregoing is put into aqueous solution to which is added a blowing agent such as a low-boiling, halogenated hydrocarbon of which the Freons of low boiling point are exemplary, if desired a mineral filler such as talc, silica, Kieselguhr, asbestos and mica, a hardener which can be a mineral or an organic acid, in common practice the hardener initiates the exothermic polymerization of the resin, the heat of which is sufficient to vaporize the blowing agent and expand the resin, and a nitrogenous compound of the type hereinabove described. If desired, one may also add a surface active agent such as a silicone oil, of which the type which is a copolymer of silicone and glycol, being stable and water soluble is preferred. Such agents are more fully described in French Pat. No. 1,462,228. The nitrogenous compound is usually added to the mixture last, as in known processes. A turbine or an apparatus which simultaneously mixes and measures the ingredients is used, followed by pouring in a stream onto a moving belt or in other known ways.

The proportions of the ingredients by weight to 100 g. of dry phenolic resin, for a preferred mixture are as follows:

| | |
|---|---|
| silicone oil | about 0.5 to 5 and preferably about 1.5; |
| blowing agent | about 1 to 30 according to density; |
| mineral filler | about 5 to 30 and preferably about 5 to 10; |
| nitrogenous compound (dry weight) | about 1 to 30; |
| acid HCl, d=1.19 for example | from 5 to 20, preferably about 15. |

The following specific examples were carried out in accordance with the foregoing principles:

Condensate A+ is a condensation of one mole of dicyandiamide with 2.1 mole of formaldehyde.

Condensate B+ is a condensation of one mole of phenol, 2.3 mole formaldehyde, and enough dicyandiamide to equal 25% of the weight of the phenol.

Foams have been made from the formulas of this invention in densities between 30 and 200 kg/m$^3$, depending largely upon the quantity of blowing agent employed, with pores of almost perfect dimensional regularity, superior resistance to compression accompanied by other excellent mechanical properties, the fire resistance classified as self-extinguishing by ASTM Test D 1692–59T.

The nitrogenous compositions used according to the invention have low reactivity which permits easy control of the hardening reaction at the time of formation and this permits the ready regulation of the density of the foam, the regularity of pore dimension, and the improvement of the mechanical properties of the final product, especially its resistance to compression. These foams have excellent resistance to heat, flame and combustion of all types. They do not smoulder.

Under the action of heat of combustible degree of nitrogenous additives decompose liberating a mixture of gases, principally ammonia, carbon dioxide and nitrogen, accompanied by radicals such as SO$_2$ when a mineral amino compound has been used. These gases create an inert atmosphere in which combustion cannot proceed and by which smouldering is extinguished. In choosing the nitrogenous components, it is advisable to choose those which release the maximum gas at smouldering temperature.

It is generally advisable to warm the foams in an oven to remove residual water and acid, an operation which, in the prior art, was limited to about 100°C. because of the risks of carbonation, but the invention has improved the qualities of the product to an extent which allows drying to be carried on at 120°C. without degradation of the foam and with substantial reduction of the heating time.

As many apparently widely different embodiments of the present invention may be made without departing from the spirit and scope thereof, it is to be understood that the invention is not limited to the specific embodiments.

What is claimed is:

| Example 1 | | | Example 2 | | |
|---|---|---|---|---|---|
| resin 1 | 100 | g. | resin 1 | 100 | g. |
| silicone | 1.5 | g. | silicone | 2 | g. |
| crushed ammonium sulfamate | 15 | g. | Condensate A+ | 25 | g. |
| Freon 11 | 5 | g. | Freon 11 | 6 | g. |
| hydrochloric acid d = 1.19 | 15 | g. | hydrochloric acid d = 1.19 | 15 | g. |

| Example 3 | | | Example 4 | | |
|---|---|---|---|---|---|
| resin 4 | 100 | g. | resin 1 | 100 | g. |
| silicone | 2 | g. | silicone | 1.5 | g. |
| condensate A+ | 20 | g. | condensate B+ | 66 | g. |
| talc | 5 | g. | Kieselguhr | 5 | g. |
| Freon 11 | 10 | g. | Freon 11 | 8.5 | g. |
| HCl d = 1.19 | 15 | g. | HCl d = 1.19 | 15 | g. |

1. The method of making incombustible, non-smoldering self-supporting insulating phenol-formaldehyde resin foams which comprises forming an aqueous solution of a phenol-formaldehyde resole resin by reacting phenol and formaldehyde under conditions of time, temperature and alkaline catalysis to cause condensation, interrupting the condensation at an intermediate point not greatly exceeding 70% to form said solution, incorporating into said aqueous solution of the resole resin a foaming agent which will release gas at or below the curing temperature of said resole resin, an acidic hardener for said resole resin and a minor amount of an organic nitrogenous compound having little or no reactivity with free formaldehyde, and is stable at the curing temperature of said resole resin, and which decomposes with the liberation of combustion repressant gas at the temperature of combustion or smoldering of said resin, said organic nitrogenous compound resulting from the reaction of formaldehyde with an organic aminated substance selected from the ureas, melamines and dicyandiamides, heating the aqueous solution to cure said resole resin and to foam said mixture without decomposing said organic nitrogenous compound.

2. The method according to claim 1 in which the nitrogenous compound is the reaction product of partially condensed phenol and formaldehyde with an amino compound of the class consisting of urea, melamine and dicyandiamide.

3. The method according to claim 1 in which the organic nitrogenous compound is the condensation product of formaldehyde, an organic amino compound of the class consisting of urea, melamine and dicyandiamide, and phenol.

4. The method according to claim 1 in which the first step of reacting phenol and formaldehyde includes vinyl alcohol in the mixture which is reacted.

5. The method according to claim 1 in which the organic nitrogenous compound is the product of the reaction of formaldehyde and a plurality of said amino compounds.

6. The method according to claim 1 in which the organic nitrogenous compound is the product of the reaction of phenol, formaldehyde and dicyandiamide.

7. The method according to claim 1 in which the organic nitrogenous compound is the reaction product of formaldehyde and dicyandiamide.

8. A self-sustaining, hardened, self-extinguishing non-smoldering, insulating foam, of phenol formaldehyde resin containing from 1 to 30 percent by weight of an interreacted formaldehyde-aminoplast which decomposes at high temperature to release gases which do not support combustion, said foam having as its essential component the reaction product of a phenol-formaldehyde resole resin and an organic nitrogenous compound, which is substantially inert to free formaldehyde, stable at the temperature of curing, said nitrogenous compound being the reaction product of formaldehyde and an organic aminated compound of the class of urea, melamines and dicyandiamide.

9. Foams according to claim 8 in which the organic nitrogenous compound is a partial condensate of formaldehyde and said amino compound.

10. Foams according to claim 8 in which the organic nitrogenous compound is a co-condensate of phenol, formaldehyde, and said organic amino compound.

* * * * *